(12) United States Patent
Quehl

(10) Patent No.: US 9,266,641 B2
(45) Date of Patent: Feb. 23, 2016

(54) ELECTRONIC DEVICE CASE HAVING AN A-FRAME CONFIGURATION

(71) Applicant: Daymen Canada Acquisition ULC, Vancouver (CA)

(72) Inventor: Luis Quehl, San Anselmo, CA (US)

(73) Assignee: The 4EProject, Inc., Stillwater, MN (US)

(*) Notice: Subject to any disclaimer, the term of this patent is extended or adjusted under 35 U.S.C. 154(b) by 167 days.

(21) Appl. No.: 14/070,567

(22) Filed: Nov. 3, 2013

(65) Prior Publication Data

US 2015/0122850 A1 May 7, 2015

(51) Int. Cl.
*B65D 5/52* (2006.01)
*A45C 11/00* (2006.01)
*G06F 1/16* (2006.01)
*H04B 1/3888* (2015.01)
*H04M 1/04* (2006.01)

(52) U.S. Cl.
CPC .............. *B65D 5/5206* (2013.01); *A45C 11/00* (2013.01); *G06F 1/1628* (2013.01); *H04B 1/3888* (2013.01); *H04M 1/04* (2013.01); *A45C 2011/002* (2013.01); *A45C 2011/003* (2013.01); *A45C 2200/15* (2013.01)

(58) Field of Classification Search
CPC ........ B65D 5/52; B65D 5/5206; B65D 5/524; B65D 5/5246; B65D 43/24; B65D 2207/00; H05K 5/03; G06F 1/1626; G06F 1/1656
USPC ......... 206/45.2–45.24, 320; 248/188.2, 188.6
See application file for complete search history.

(56) References Cited

U.S. PATENT DOCUMENTS

| | | | |
|---|---|---|---|
| 6,772,879 B1 * | 8/2004 | Domotor ..................... 206/45.23 |
| 8,281,924 B2 * | 10/2012 | Westrup ......................... 206/320 |
| 8,474,609 B1 * | 7/2013 | Hong et al. .................. 206/45.2 |
| 8,851,280 B2 * | 10/2014 | Wen ............................... 206/320 |
| 8,887,910 B2 * | 11/2014 | Ashley et al. ................. 206/320 |
| 8,899,415 B2 * | 12/2014 | McCosh et al. ............... 206/320 |
| 8,960,421 B1 * | 2/2015 | Diebel ........................ 206/45.2 |
| 9,000,871 B2 * | 4/2015 | Cencioni ............... G06F 1/1626 206/45.2 |
| 2010/0294683 A1 * | 11/2010 | Mish et al. .................... 206/320 |

* cited by examiner

*Primary Examiner* — Bryon Gehman

(57) ABSTRACT

An electronic device case includes a front panel, a back panel, and a spine connecting the front panel and the back panel. A frame configured to hold an electronic device is hingedly coupled the back panel adjacent a first edge of the back panel. The electronic device case includes a first configuration with a second edge of the back panel opposite the first edge disposed adjacent to the frame and a second configuration wherein the frame and back panel are rotated relative to each other around the hinged coupling such that the second edge of the back panel is spaced from the frame.

14 Claims, 12 Drawing Sheets

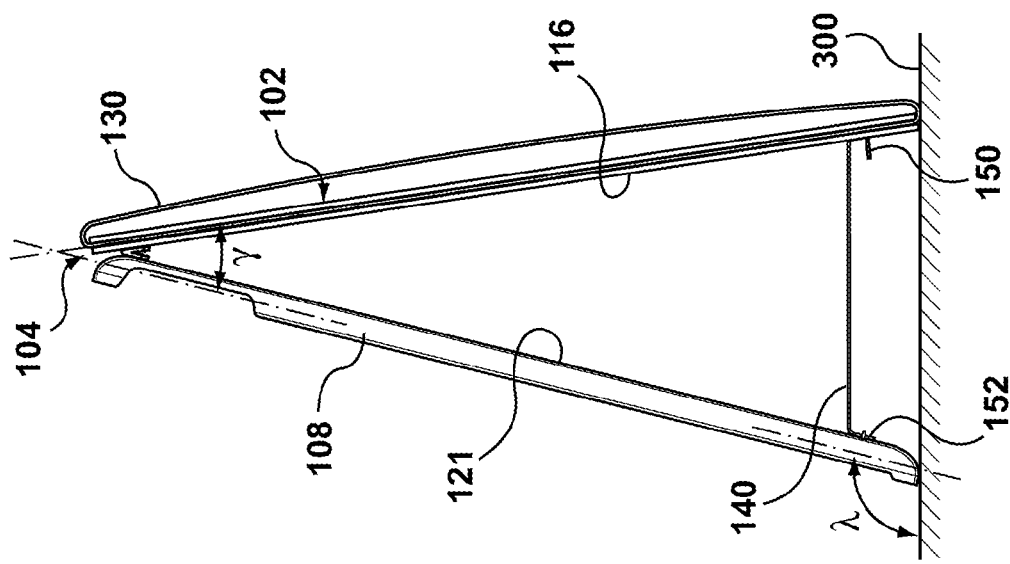
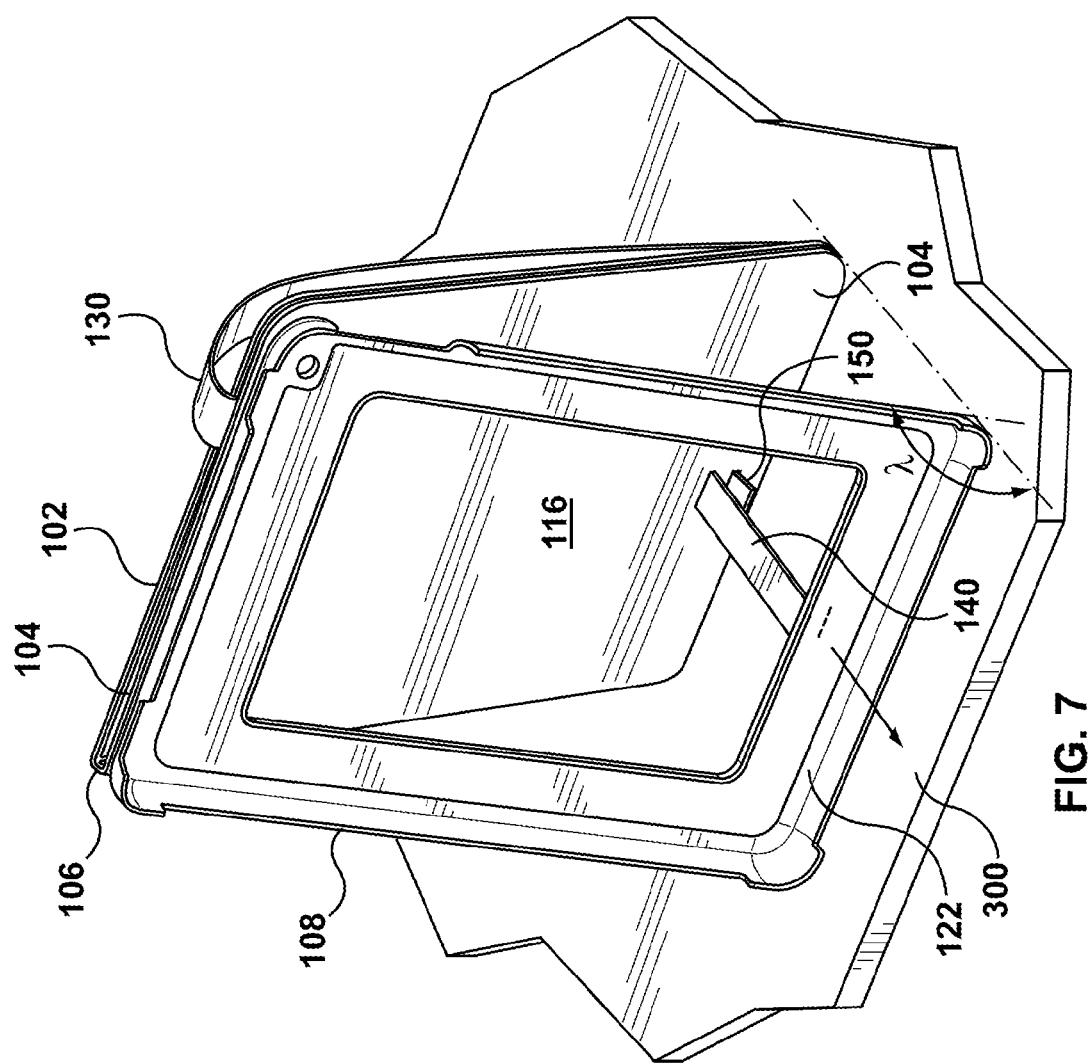

ELECTRONIC DEVICE CASE HAVING AN A-FRAME CONFIGURATION

FIELD OF THE INVENTION

The invention is related to a holder or case for an electronic device such as a tablet computer.

BACKGROUND OF THE INVENTION

Portable or handheld electronic devices, such as eReader devices, personal digital assistants, cellular telephones, tablet computers and the like, have internal circuitry, delicate components, and screens that are prone to damage. Thus, there are holders, covers or cases for such devices that protect such devices from the environment. Further, it is often desirable to stand these electronic devices at various orientations and angles to use the electronic devices various functions, such as watching video programming, viewing still images, typing on a touch-screen keypad/keyboard that appears on the device screen, and video-chatting with another user at a remote location, such as through FaceTime® or Skype®. In order to protect their device and serve all viewing preferences, users often purchase protective holders or cases with viewing stands. However, many conventional cases available for mobile phones, PDAs, portable video/music players, and table computers, have rather limited functionality. Although they generally succeed in protecting the portable electronic device, they can detract from its portability, usability and/or aesthetic appearance, and fall short of the needs of the user in many other ways. Thus, there is a need for a case for electronic devices which can conveniently hold the electronic device in various desirable viewing configurations.

BRIEF SUMMARY OF THE INVENTION

Embodiments hereof relate to a case or holder for portable electronic devices. In particular, embodiments hereof relate to a case for an electronic device including a front panel, a back panel, and a spine connecting the front panel to the back panel. The case further includes a frame configured to hold the electronic device. The frame is hingedly coupled the back panel adjacent a first edge of the back panel. The electronic device case includes a first configuration with a second edge of the back panel opposite the first edge disposed adjacent to the frame and a second configuration with the frame and back panel are rotated relative to each other around hinged coupling such that the second edge of the back panel is spaced from the frame. In the second configuration, the frame and the back panel form an A-frame configuration.

In an embodiment, the front panel of the electronic device case includes a fold line between an inner edge adjacent the spine and an outer edge opposite the spine. The electronic device case therefore also includes a stand configuration wherein the front panel is rotated around the spine such that the outer surface of the front panel faces the outer surface of the back panel, the front panel is folded along the fold line, and the outer edge of the front panel is removably coupled to the outer surface of the back panel. The outer edge of the front panel may be removably coupled to the outer surface of the back panel by tucking the outer edge under an elastic strap attached to the outer surface of the back panel. Further, the elastic strap in the area where the front panel is tucked may include a gripping or nonslip material. In the stand configuration, the electronic device case may be oriented such that the case supports itself on a surface with the inner surface of the front panel between the spine and the fold line contacting the surface or such that the case supports itself on the surface with the fold line and an outer edge of the back panel opposite the spine resting against the surface.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 4A is a detailed view of a portion of FIG. 4.

FIG. 7 is a schematic illustration of the electronic device case of FIG. 1 with the frame separated from the back panel and the bottom edges of the frame and the back panel resting against a surface for portrait viewing.

FIG. 8 is a schematic illustration of a side view of the electronic device case in the A-frame configuration of FIG. 7.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of the invention is in the context of securing electronic devices, the invention may also be used to secure other devices as it is deemed useful. Furthermore, there is no intention to be bound by any expressed or implied theory presented in the preceding technical field, background, brief summary or the following detailed description.

Figure 1:
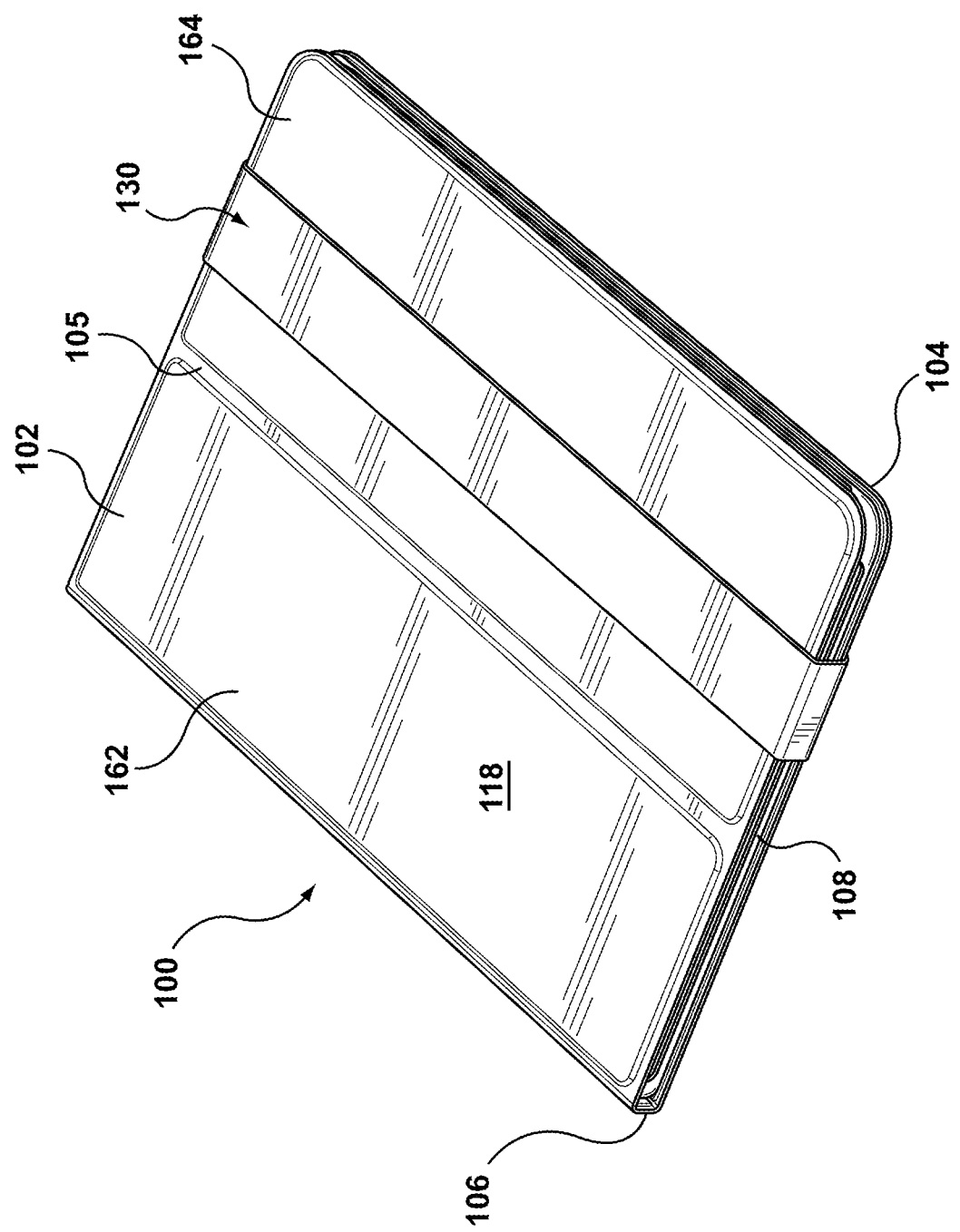
FIG. 1 is a schematic illustration of the outside of the front panel of an electronic device case according to an embodiment hereof in a closed configuration.
Figure 2:
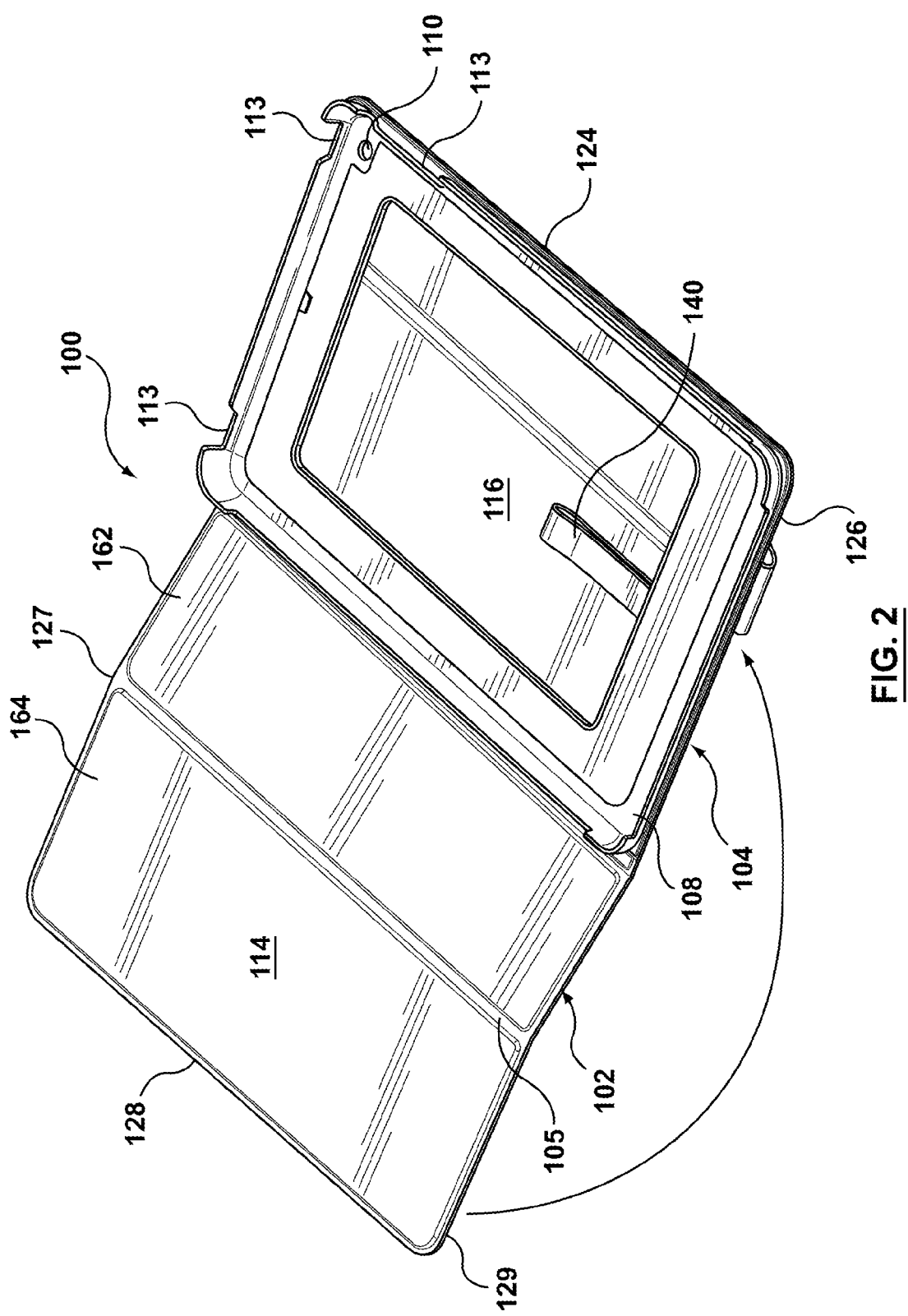
FIG. 2 is a schematic illustration of the electronic device case of FIG. 1 laid open with the inside surfaces of the case visible.

Embodiments hereof relate to an electronic device case 100 for protecting, viewing and operating an electronic device 109. Case 100 may be formed from a relatively hard or rigid material that operates to protect the electronic device from breakage or damage. In the embodiment depicted in FIGS. 1-13, case 100 includes a first or front panel 102 connected to a second or back panel 104 via a spine 106 in the manner of a book, as best seen in FIGS. 1 and 2. Further, a frame 108 for removably holding the electronic device 109 is hingedly coupled to an inner surface 116 of back panel 104, as will be explained in more detail below. Front panel 102 includes an inner surface 114, an outer surface 118, an inner edge attached to spine 106, an outer edge 128, a top edge 127, and a bottom edge 129. Front panel 102 further includes a fold line 105 that divides front panel 102 into a first front panel section 162 and a second front panel section 164 such that front panel 102 can be folded back, as will be explained in more detail below. Fold line 105 may be created by a break in the padding of front panel 102, stitching, a thinner section of material, or other ways to form a fold line known to those skilled in the art. Similarly, back panel 104 includes inner surface 116, an outer surface 120, an inner edge attached to spine 106, an outer edge 124, a top edge 125, and a bottom edge 126. Those skilled in the art would recognize that although the terms "top" and "bottom" are used, they are only used for convenience to differentiate different edges, and that case 100 may be oriented in any direction.

Figure 3:
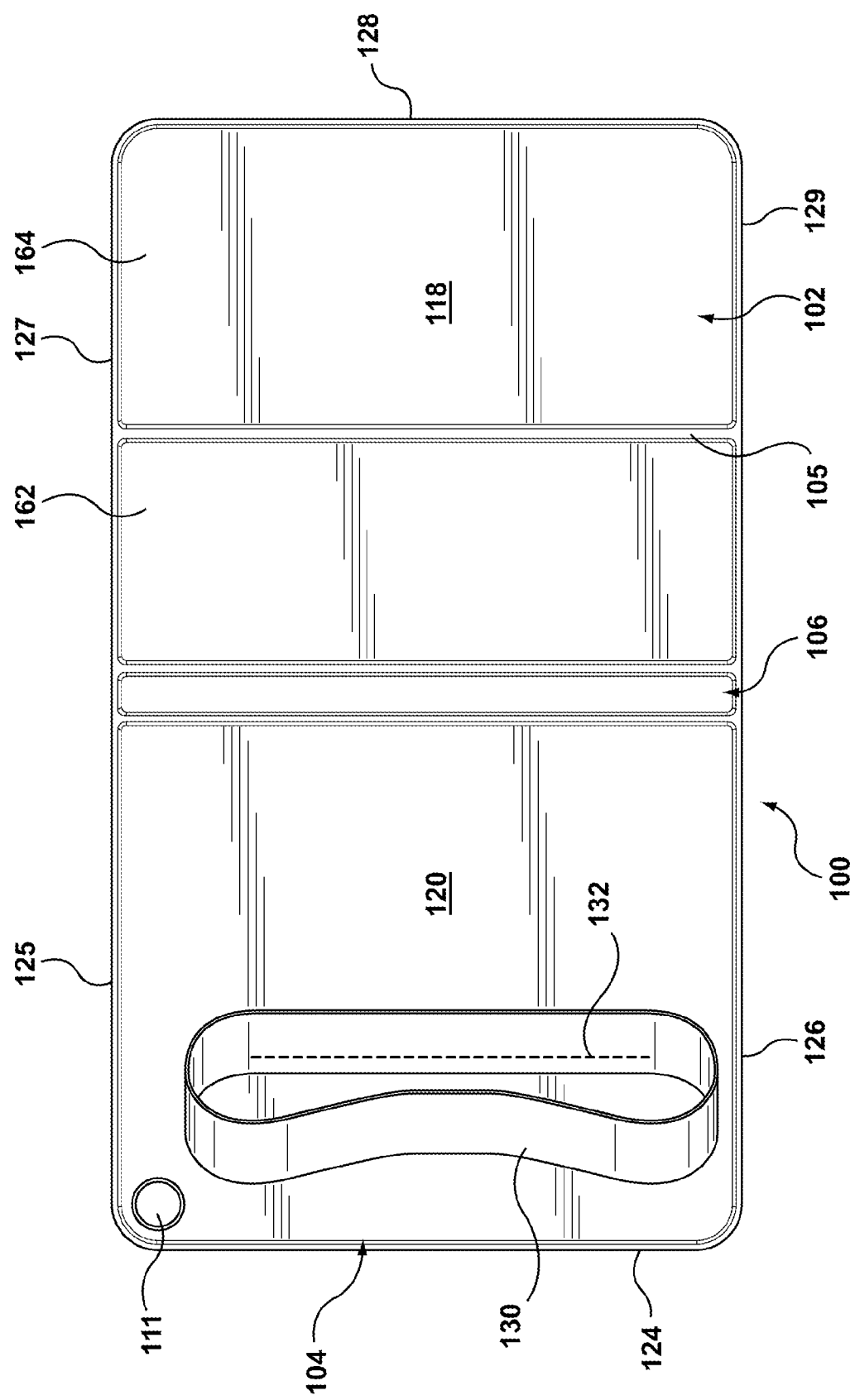
FIG. 3 is a schematic illustration of the electronic device case of FIG. 1 laid open with the outside surfaces of the case visible.

A strap 130 is attached to outer surface 120 of back panel 102, as best shown in FIG. 3. Strap 130 is attached along a length of outer surface 120 of back panel by stitching 132. The length of stitching 132 is at least 50 percent of the length of back panel 102 from the top edge to the bottom edge thereof. Strap 130 preferably is formed from an elastic material known to those skilled in the art, such as, but not limited to, a 25 mm elastic band, silicone band, or latex band. Further, strap 130 may include a gripping material 134 on an inner surface thereof along a portion 136 of strap 130, as explained in more detail below.

In the embodiment shown in FIGS. 1-13, frame 108 is made from a plastic material such as, but not limited to, polycarbonate materials, acrylonitrile butadiene styrene (ABS), polypropylene, and other similar materials known to those skilled in the art. Frame 108 further includes a flat inner surface 122 that curls or curves at its edges 123 towards inner surface 114 of front panel 102 when case 100 is in the closed configuration shown in FIG. 1 to form a holder for the electronic device. With the curved edges 123, frame 108 forms a snap fit connection. Electronic device 109 is inserted into frame 108 and is held by curved edges 123 of frame 108 extending around the side surfaces of electronic device 109, as shown in FIG. 2A. In the embodiment shown, curved edges 123 of frame 108 is generally continuous, with openings 110 through frame 108 and gaps 113 in curved edges 123 strategically located for access to edges of electronic device 109. For example, and not by way of limitation, opening 110 may be an opening that allows a lens of a camera in electronic device 109 to have access through frame 108, with a corresponding and aligned opening 111 through back panel 104 (see FIG. 3) allowing the lens of the camera to take pictures while electronic device 109 is positioned in frame 108. Other openings (not shown) through frame 108 and back panel 104 may be provided for such items as speakers, microphones, and other similar items typically found on an electronic device. Similarly, gaps 113 in curved edges 123 may provide access to power ports, USB ports, power switches, headphone ports, volume controls, and other similar items generally found along edges of electronic devices. Frame 108 and case 100 are generally sized to hold particular sizes of electronic devices. For example, and not by way of limitation, case 100 and corresponding frame 108 may be sized to receive an eBook reader such as the Kindle™, or tablet computers, such as the iPad™ or iPad™ mini from Apple Inc. or other similar devices. Case 100 and frame 108 may also be sized to hold other electronic devices such as a mobile phone, a personal digital assistant (PDA), an MP3 player, or other handheld portable electronic devices.

Front panel 102, back panel 104, and spine 106 may be formed from any relatively hard or stiff protective material including but not limited to cardboard, bamboo, fiberboard, wood, wood fiber, metal, polymer, synthetic textiles, nylon, polyurethane, wool, polyester, and other suitable materials as would be known to those skilled in the art. In one embodiment, outer or exterior surfaces 118, 120 of front and back panels 102, 104, respectively, may include a covering for aesthetic purposes. The covering may be canvas, cloth, synthetic leather, leather, or tarpaulin. Further, in one embodiment, inner or interior surfaces 114, 116 of front and back panels 102, 104, respectively, may include an inner lining of a soft, non-scratch microfiber material and/or a thin padding of approximately 2-3 mm thickness between the lining and the hard protective material of front panel 102 to protect the electronic device when electronic device case 100 is closed.

FIGS. 1-13 show electronic device case 100 in use to provide various configurations for use electronic device 109. Other features of electronic device case 100 are described herein with respect to the use of electronic device case 100. As noted above, FIG. 1 shows case 100 in a closed or book configuration with inner surface 114 of front panel 102 folded over such that it faces inner surface 116 of back panel 104 (and electronic device 109 if it is disposed in frame 108). Further, strap 130 may be stretched over outer surface 118 of front panel 102 to maintain case 100 in the closed configuration until a user removes strap 130.

Figure 4:
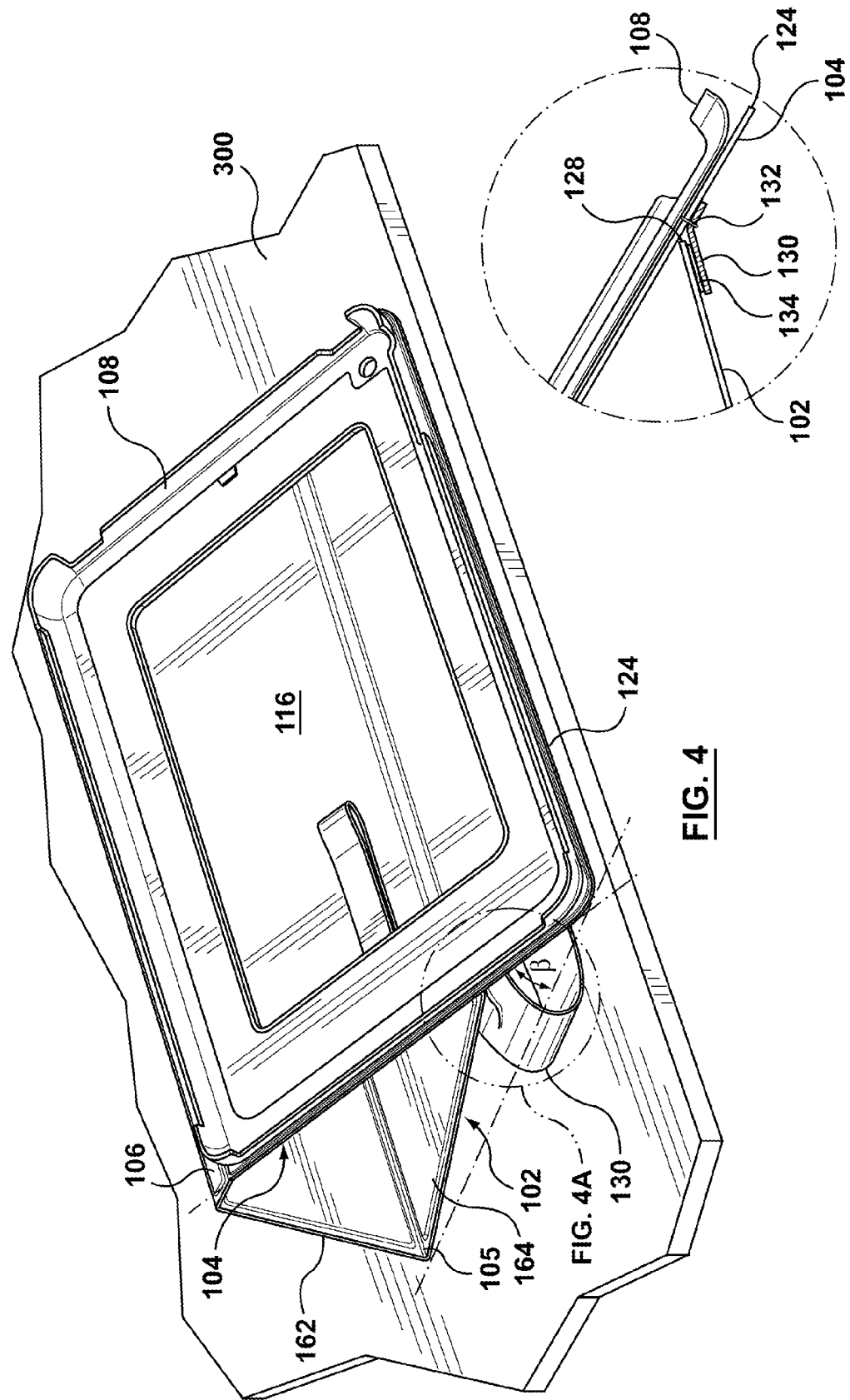
FIG. 4 is a schematic illustration of the electronic device case of FIG. 1 with the front panel folded back and tucked between the outside surface of the back panel and a portion of the strap attached to the back panel.

With strap 130 removed from front panel 102, front panel 102 may be opened as shown in FIG. 2 by lifting front panel 102 such that it moves away from frame 108 and rotates around spine 106. A user may simply keep case 100 in this configuration in the manner of a book. However, continuing to rotate panel 102 around spine 106, as shown by the arrow in FIG. 2, results in outer surface 118 of panel 102 facing outer surface 120 of back panel 104. Further, front panel 102 can be folded along fold line 105 and outer edge 128 of front panel 102 is inserted or tucked under strap 130, between strap 130 and outer surface 120 of back panel 104, as shown in FIGS. 4 and 4A. Further, as can be seen in FIG. 4A, gripping material 134 provided on strap 130 along the portion of strap 130 where front panel 102 is inserted, assists in keeping outer edge 128 from slipping out from strap 130 such that outer edge 128 of front panel 102 is held between strap 130 and back panel 104. In the embodiment shown in FIG. 4A, gripping material 134 is disposed along an inner surface of strap 130 between strap 130 and outer surface 120 of back panel 104. Gripping material 134 may be, but is not limited to, a polyurethane (PU) or thermoplastic polyurethane adhesive film with a durometer and surface texture specifically tuned for improved grip, TPE (thermoplastic elastomer) grip tape, and other similar materials known to those skilled in the art.

Figure 5:
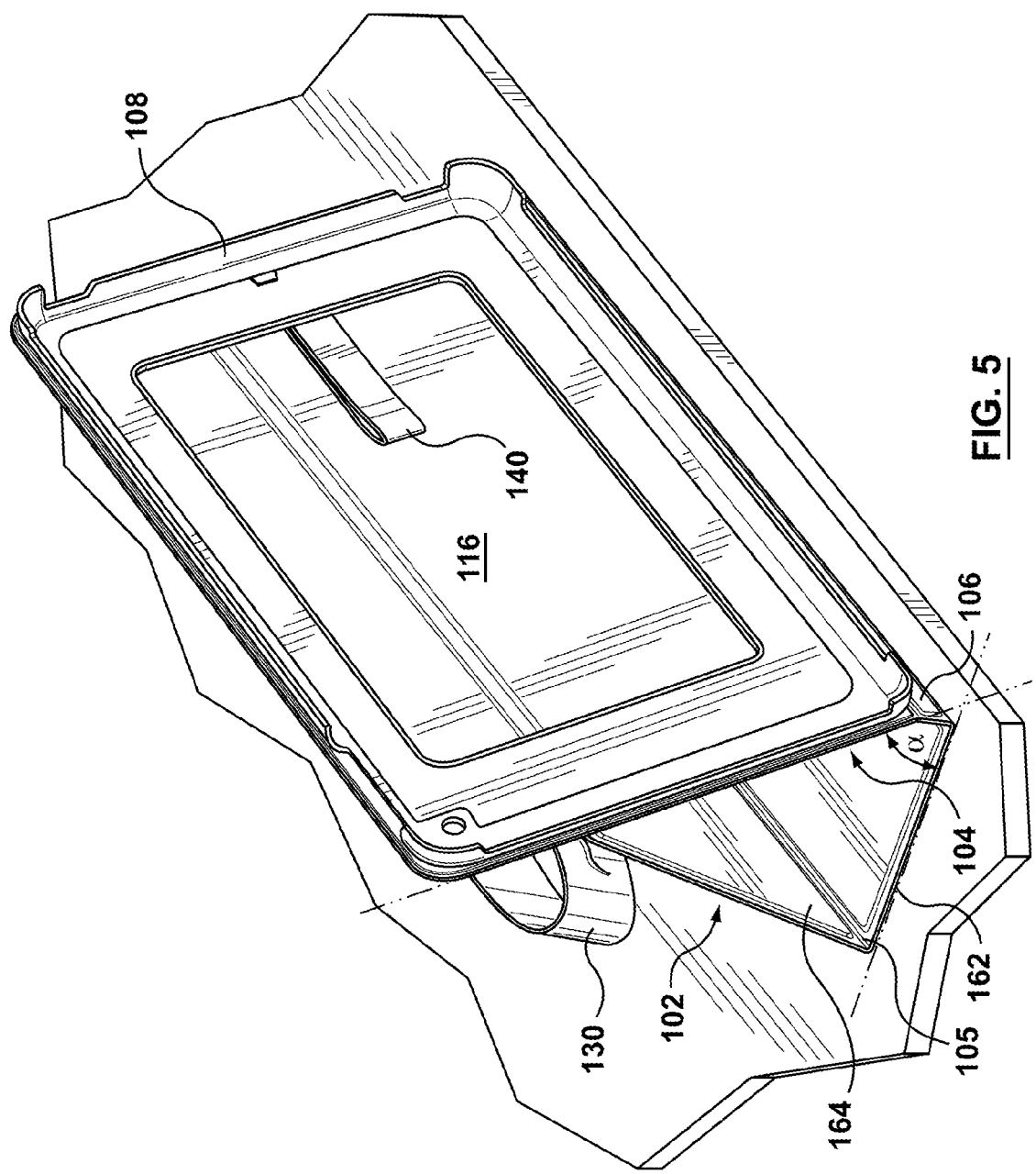
FIG. 5 is a schematic illustration of the electronic device case of FIG. 1 in the configuration of FIG. 4 and resting on the spine for landscape viewing.
Figure 6:
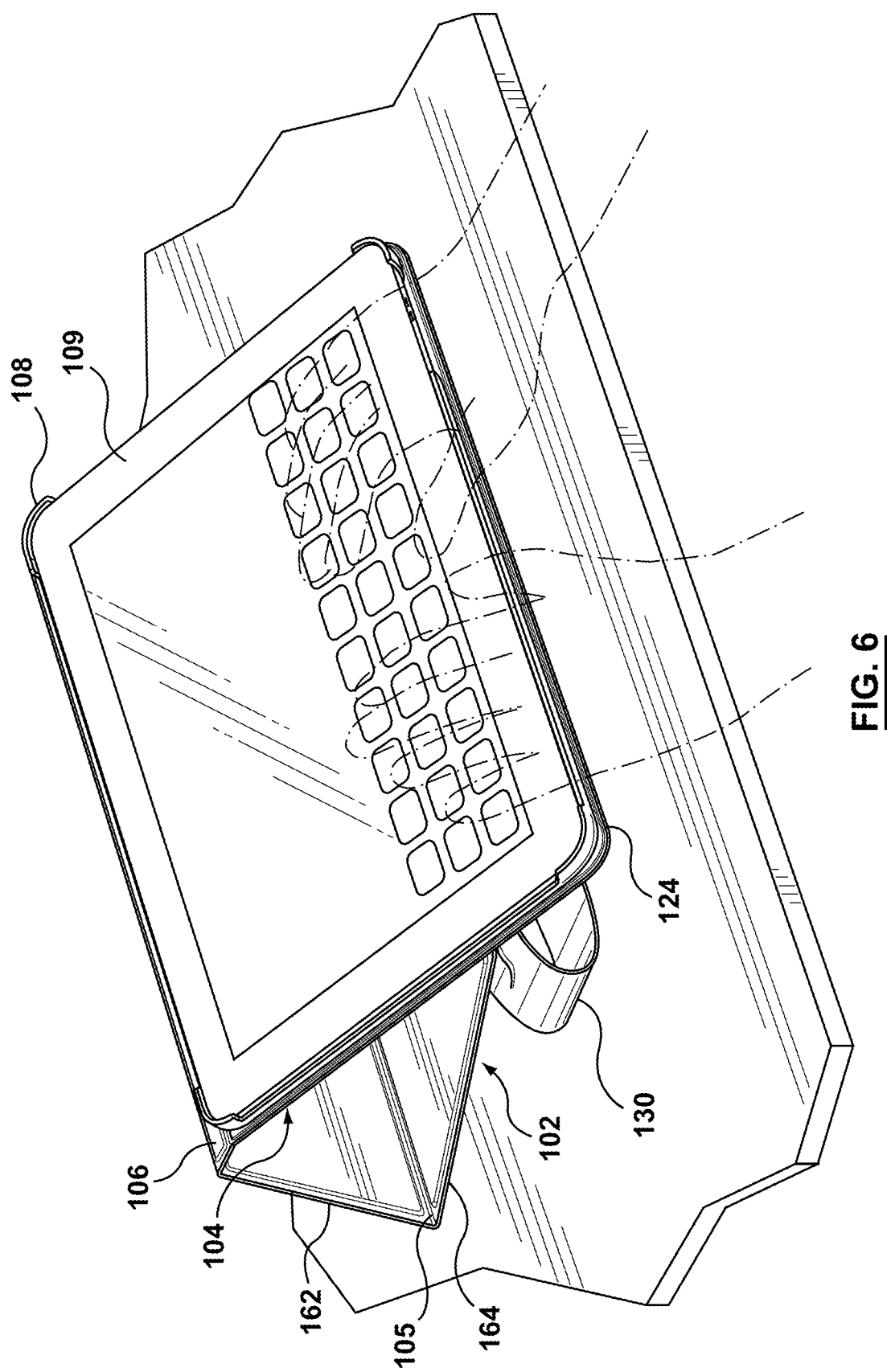
FIG. 6 is a schematic illustration of electronic device case of FIG. 1 in the configuration of FIG. 4 and resting on the inside surface of the front panel and the outside surface of the back panel for landscape viewing and typing.

With front panel 102 folded back and outer edge 128 thereof inserted and maintained between strap 130 and outer surface 120 of back panel 104, case 100 is in a stand configuration, as shown in FIGS. 4-6. In the stand configuration, case 100 may be utilized in a landscape viewing configuration or a landscape typing configuration. The landscape viewing configuration is shown in FIG. 5. In the landscape viewing configuration, case 100 is in the stand configuration and is disposed against a surface 300 with the inner surface of first front panel portion 162 resting against surface 300, as shown in FIG. 5. Such a landscape viewing configuration provides an angle α of approximately 60 to 70 degrees. Such a configuration is convenient for landscape viewing of videos, photographs, documents, or other images displayed on the electronic device 109. Further, with case 100 in the same stand configuration, case 100 may be re-oriented such that fold 105 and outer edge 124 of back panel 104 rest against surface 300, as shown in FIGS. 4 and 6. Such a configuration provides a convenient angle for typing on a touch-screen keyboard or viewing the screen of the electronic device. Such a landscape typing configuration in the present embodiment provides an angle β of approximately 22 degrees and may range from approximately 20-30 degrees. Those skilled in the art would recognize that angles α and β can be varied depending on the size of case 100, the location of fold line 105, the location of strap 130 along back panel 104, and other factors.

Figure 11:
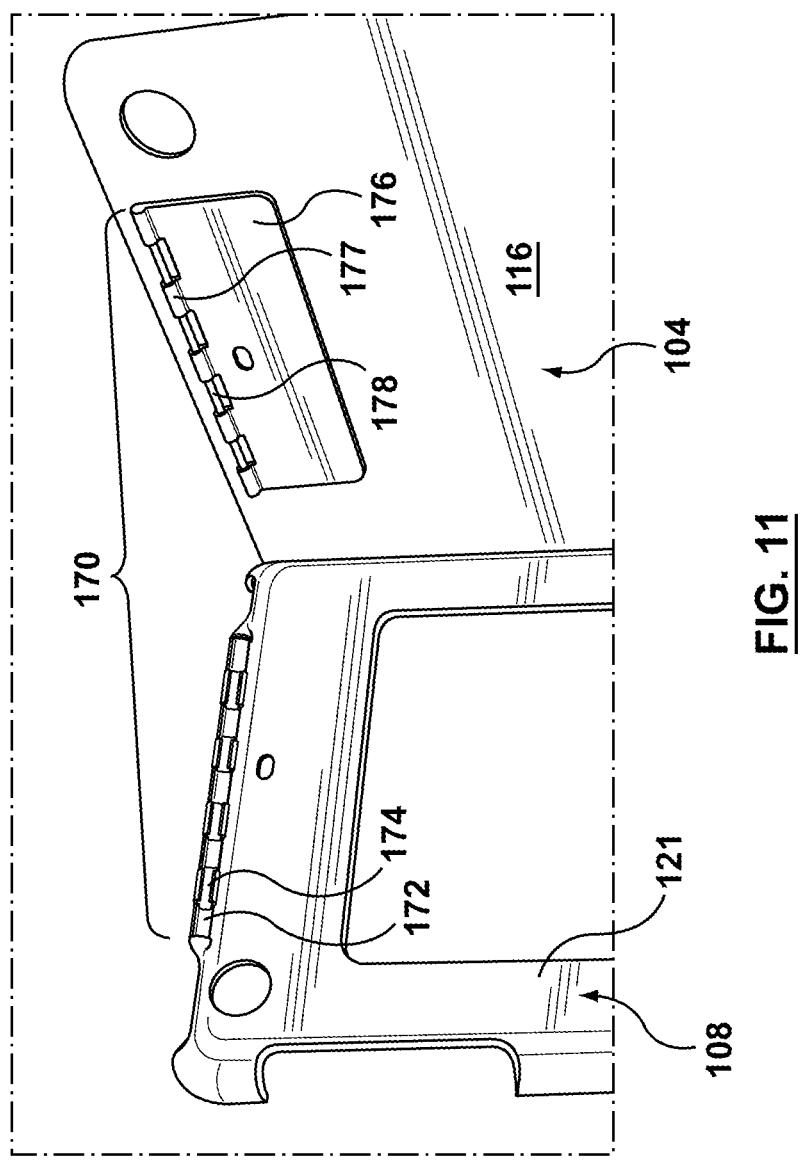
FIGS. 11-13 are detailed views of the hinge connection between the frame and the back panel of the electronic device case.
Figure 12:
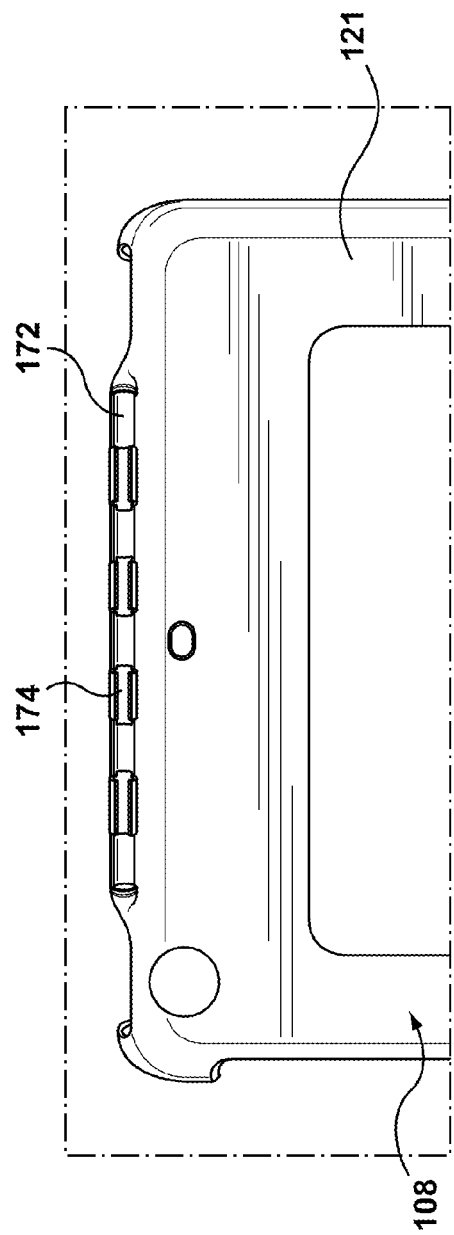
Figure 13:
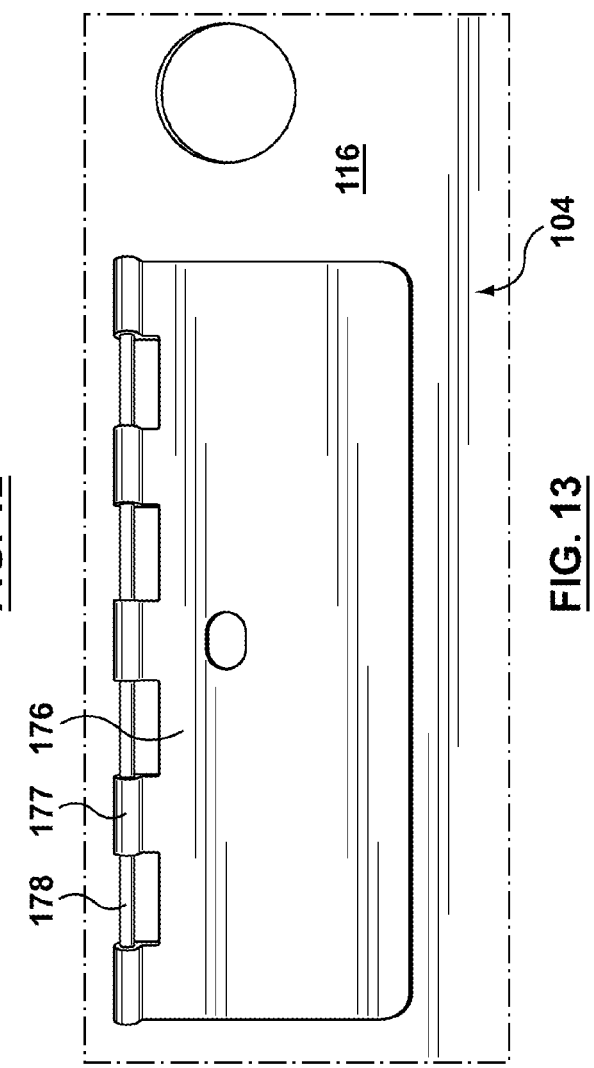

Further, although case 100 could be disposed in a portrait viewing configuration by standing case 100 on bottom edge 126 of back panel 104 and bottom edge 124 of front panel 102 (or top edges 125, 127 of back and front panels 104, 102) with front panel 102 folded back and inserted under strap 130, such a portrait viewing configuration is not very stable and results in electronic device 109 disposed at 90 degrees relative to surface 300. Thus, in order to provide a more convenient portrait or A-frame viewing configuration, frame 108 is hingedly connected to inner surface 116 of back panel 102 adjacent top edge 125 of back panel 104. FIGS. 11-13 show details of one embodiment of such a hinge connection 170, with frame 108 separated from back panel 104 for convenience. In the embodiment shown, a back surface 121 of frame 108 includes recesses 172 and knuckles 174 for connecting to corresponding parts coupled to inner surface 116 of back panel 108. In particular, in the embodiment shown, hinge connection 170 further includes a plate or wing 176 coupled to inner surface 116 of back panel 104 with knuckles 177 extending therefrom and holding a pin 178. The exposed portions of pin 178 between knuckles 177 are snap-fit into knuckles 174 of frame 108 and knuckles 177 are disposed within recesses 172 of frame 108 to complete the hinge connection 170. Although a specific hinge connection 170 is described herein, those skilled in the art would recognize that other types of hinge connections may also be used.

With hinge connection 170 between frame 108 and back panel 104, frame 108 and back panel 104 may be rotated relative to each around the location of hinge connection 170, thereby permitting bottom edges 107, 126 of frame 108 and pack panel 104, respectively, to move apart from each other and towards each other, as shown by comparing FIGS. 1-6 with FIGS. 7-8. Further, as shown in FIGS. 7-10, a strap 140 is attached at a first end 142 to inner surface 116 of back panel 104 and at a second end 144 to back surface 121 of frame 108. Strap 140 limits the maximum angle γ between back panel 104 and frame 108. In the embodiment shown, angle γ is approximately 35-50 degrees. Further, in the A-frame configuration, the viewing angle λ is approximately 105-120 degrees. However, those skilled in the art would recognize that other angles may be used depending on the size of the case, the desired viewing angle, and other factors known to those skilled in the art. Further, instead of strap 140, those skilled in the art would recognize that other ways to limit or set the angle γ may be utilized. For example, and not by way of limitation, the type of hinge connection 170 may be used to limit or set angle γ, as known to those skilled in the art.

Figure 9:
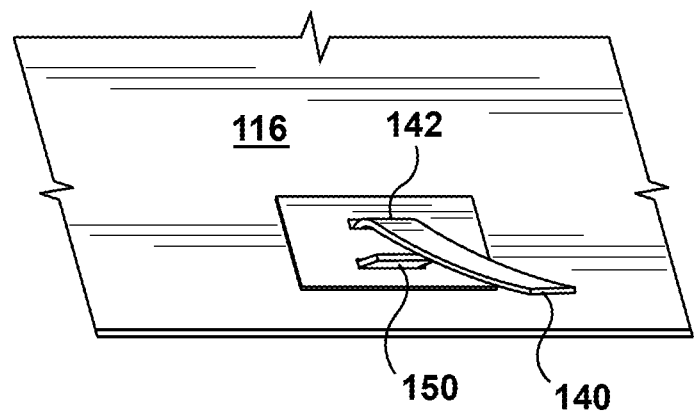
FIG. 9 is a schematic illustration of a portion of the inner surface of the back panel of the electronic device case of FIG. 1.
Figure 10:
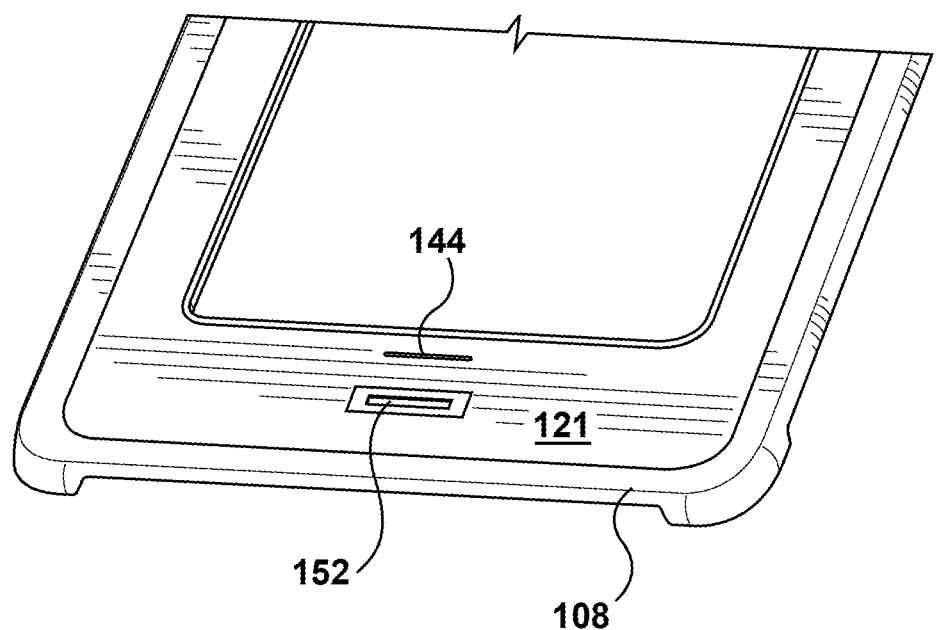
FIG. 10 is a schematic illustration of a portion of the back surface of the frame of the electronic device case of FIG. 1.

FIGS. 9-10 also show another feature of case 100 of the present application. In particular, adjacent bottom edge 126 of back panel 104, a protrusion 150 extends from inner surface 116. Protrusion 150 is situated and configured to snap-fit fit into a recess 152 in back surface 124 of frame 108. Thus, when frame 108 is closed against back panel 104, protrusion 150 snap-fits into recess 152 such that frame 108 does not move relative to back panel 104 unless the user pulls frame 108/back panel 104 with sufficient force to dislodge the snap-fit connection. This connection prevents frame 108 and back panel 104 from moving relative to each other when it is not desired by the user. Those skilled in the art would recognize other removable connections may be utilized to selectively couple the free end portions of frame 108/back panel 104 to each other. For example, and not by way of limitation, a hook and loop connection, magnetic connection, or other similar removable connections may be utilized.

Figure 14:
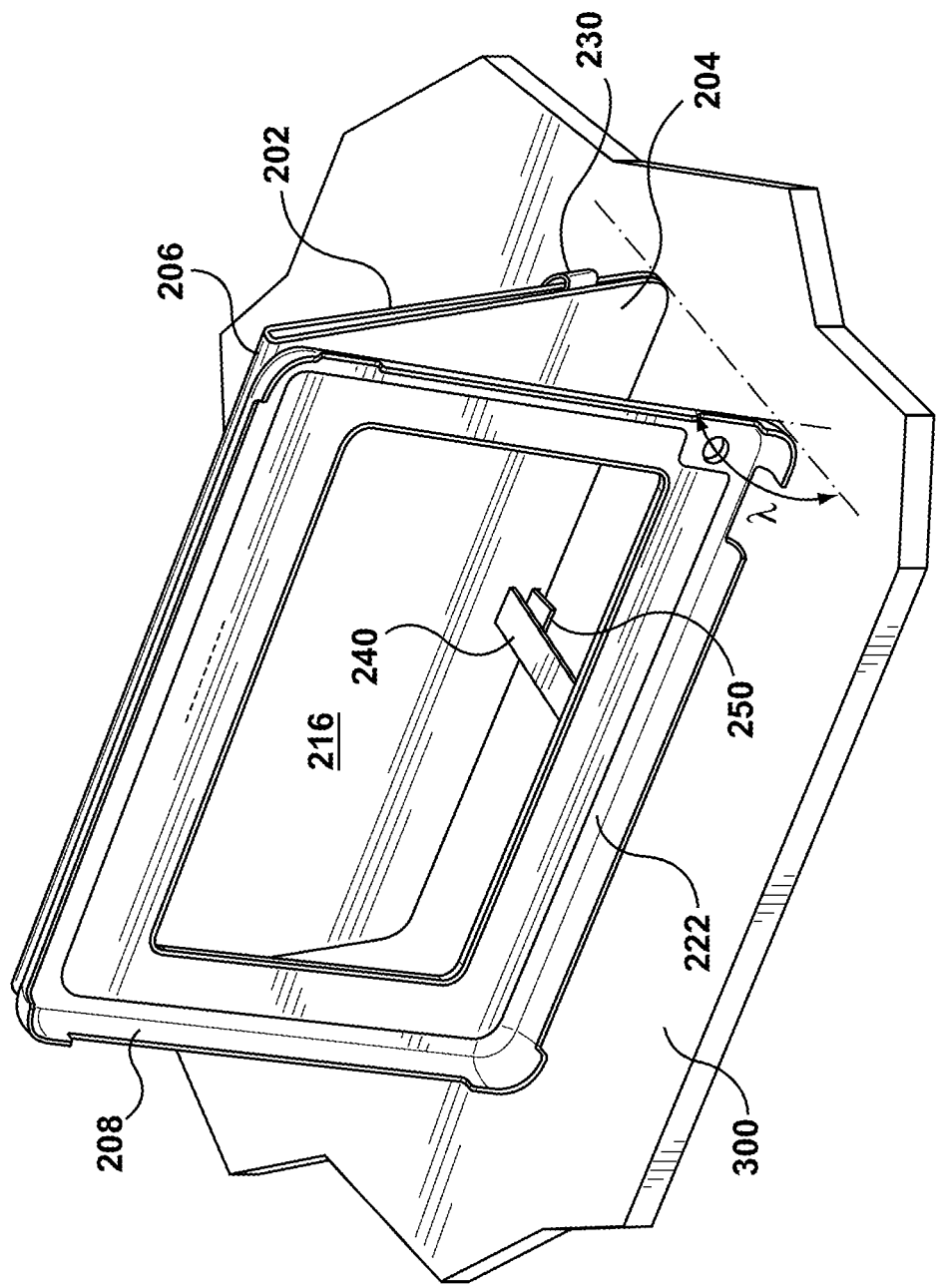
FIG. 14 is a schematic illustration of an electronic device case in accordance with another embodiment hereof in the A-frame configuration.
Figure 15:
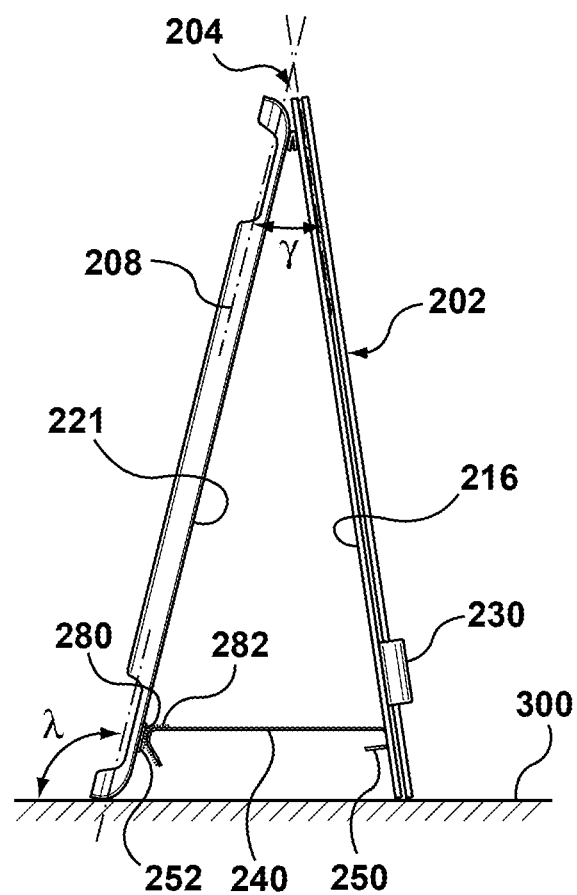
FIG. 15 is a schematic illustration of a side view of the electronic device case in the A-frame configuration of FIG. 14.

FIGS. 14-15 show another embodiment of an electronic device case 200 of the present application, wherein like reference numerals represent similar elements. In the embodiment shown, case 200 is identical to case 100 except that hinge connection 270 between frame 208 and back panel 204 is not located adjacent top edge 225 of back panel 204. Instead, hinge connection 270 is adjacent the inner edge of back panel 204 adjacent spine 206. Further, strap 240 and snap-fit connection 250/252 are located adjacent the outer edges of frame 208 and back panel 204 instead of adjacent the bottom edges. Accordingly, as shown in FIG. 14, when case 200 is in the A-frame configuration with outer edges of frame 208 and back panel 204 resting against surface 300, the electronic device is in a landscape viewing configuration. Those skilled in the art would recognize that angles λ and γ in FIGS. 14-15 would be different than the corresponding angles shown in FIGS. 7-8, all other things being equal. However, those skilled in the art would also recognize that the angles can be varied as desired by the designer, such as by changing the length of strap 240, changing characteristics of the hinge connection 170, and other factors known to those skilled in the art. Further, those skilled in the art would recognize that the stand configurations described with respect to FIGS. 4-6 apply equally to electronic device case 200.

In another embodiment, either first end or second end of strap 240 may be removably attached to frame 208 or back panel 204. For example, strap 240 may include a hook or loop material 282 along a length of strap 240, as shown in FIG. 15. The back surface 221 of frame 209 or inner surface 216 of back panel 204 may include a corresponding loop or hook material 280. In the embodiment shown in FIG. 15, back surface 221 of frame 208 includes loop or hook material 280. In such an embodiment, the angle γ may be varied by the user by varying the location along the length of strap 240 that strap 240 is attached to the loop or hook material 280 on back surface 221 of frame 208.

While various embodiments according to the present invention have been described above, it should be understood that they have been presented by way of illustration and example only, and not limitation. Further, each of the embodiments and parts described with respect to such embodiments may be used with each of the other embodiments. For example, and not by way of limitation, the adjustable angle described with respect to the removably attached strap 240 may be used in the embodiment of FIGS. 1-13. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An electronic device case comprising:
   a first panel including a first panel outer surface and a first panel inner surface;
   a second panel including a second panel outer surface and a second panel inner surface;
   a spine connecting the first panel to the second panel; and
   a frame having a front surface configured to hold an electronic device and a back surface hingedly coupled to the second panel adjacent a first edge of the second panel, wherein the electronic device case includes a first configuration with a second edge of the second panel opposite the first edge disposed adjacent to the frame and the first panel inner surface facing the front surface of the frame, and a second configuration wherein the first panel is rotated about the spine such that the first panel outer surface faces the second panel outer surface and the frame and second panel are rotated relative to each other around the hinged coupling such that the second edge of the second panel is spaced from the frame, wherein the back surface of the frame faces the second panel inner surface in both the first configuration and the second configuration.

2. The electronic device case of 1, wherein in the first configuration, the back surface of the frame is in contact with the inner surface of the second panel, and wherein in the second configuration, the back surface of the frame is spaced from the inner surface of the second panel except at the hinged coupling.

3. The electronic device case of claim 1, further comprising a strap including a first end coupled to the second panel and a second end coupled to the frame, wherein the strap limits the amount of separation between the frame and the second panel in the second configuration.

4. The electronic device case of claim 3, wherein at least one of the first end or the second end of the strap is removably attached to the second panel or the frame, respectively, such that the limit on the amount of separation between the frame and the second panel in the second configuration may be varied.

5. The electronic device case of claim 1, further comprising a removable connection remoavably connecting the frame and the second panel in the first configuration.

6. The electronic device case of claim 5, wherein the removable connection is selected from the group consisting of a snap fit connection, a hook and loop connection, and a magnetic connection.

7. An electronic device case comprising:
   a first panel including a first panel outer surface and a first panel inner surface;
   a second panel including a second panel outer surface and a second panel inner surface;
   a spine connecting the first panel to the second panel;
   a frame configured to hold an electronic device, wherein the frame is hingedly coupled to the second panel adjacent a first edge of the second panel, wherein the electronic device case includes a first configuration with a second edge of the second panel opposite the first edge disposed adjacent to the frame and a second configuration wherein the frame and second panel are rotated relative to each other around the hinged coupling such that the second edge of the second panel is spaced from the frame; and
   an elastic strap attached to an outer surface of the second panel, wherein the elastic strap forms a loop and is configured such that when the electronic device case is in the first configuration and the first panel is configured such that the inner surface of the first panel faces the front surface of the frame, the elastic strap may be extended over the outer surface of the first panel such that the elastic strap extends along the outer surface of the second panel and the outer surface of the first panel to hold the inner surface of the first panel against the frame.

8. The electronic device case of claim 7, wherein the elastic strap is attached to the outer surface of the second panel along an attachment length of the second panel between the first edge and the second edge of the second panel, and wherein the attachment length is at least half of a length between the first edge and the second edge.

9. The electronic device of claim 8, wherein the elastic strap has a width such that a portion of the width is not directly attached to the second panel along the attachment length.

10. The electronic device case of claim 9, wherein the first panel further includes a fold line between an inner edge of the first panel adjacent the spine and an outer edge of the first panel opposite the spine, wherein the electronic device case includes a stand configuration wherein the first panel is rotated around the spine such that the outer surface of the first panel faces and outer surface of the second panel, the first panel is folded along the fold line, and the outer edge of the first panel is tucked between an inner surface of the elastic strap and the outer surface of the second panel.

11. The electronic device case of claim 10, wherein the elastic strap further includes a gripping material attached to the inner surface of the elastic strap along an area where the outer edge of the first panel is tucked between the inner surface of the elastic strap and the outer surface of the second panel in the stand configuration.

12. The electronic device case of claim 11, wherein the gripping material is one of a polyurethane adhesive film, a thermoplastic polyurethane adhesive film, and a thermoplastic elastomer grip tape.

13. An electronic device case comprising:
   a first panel including a first panel outer surface and a first panel inner surface;
   a second panel including a second panel outer surface and a second panel inner surface;
   a spine connecting the first panel to the second panel; and
   a frame configured to hold an electronic device, wherein the frame is hingedly coupled to the second panel adjacent a first edge of the second panel, wherein the electronic device case includes a first configuration with a second edge of the second panel opposite the first edge disposed adjacent to the frame and a second configuration wherein the frame and second panel are rotated relative to each other around the hinged coupling such that the second edge of the second panel is spaced from the frame;
   wherein the first panel further includes a fold line between an inner edge of the first panel adjacent the spine and an outer edge of the first panel opposite the spine, wherein the electronic device case includes a stand configuration wherein the first panel is rotated around the spine such that the outer surface of the first panel faces the outer surface of the second panel, the first panel is folded along the fold line, and the outer edge of the first panel is removably coupled to the outer surface of the second panel.

14. The electronic device case of claim 13, wherein in the stand configuration the electronic device case includes a first orientation wherein the electronic device case supports itself on a surface with the inner surface of the first panel between the spine and the fold line contacting the surface and a second orientation wherein the electronic device case supports itself on the surface with the fold line and an outer edge of the second panel opposite the spine resting against the surface.

* * * * *